United States Patent
Ducheyne et al.

(10) Patent No.: US 9,731,969 B2
(45) Date of Patent: Aug. 15, 2017

(54) MEMBRANES, AZEOTROPIC AND CATALYTIC COMPONENTS

(71) Applicants: Technology for Renewable Energy Systems (TFRES) bvba, Antwerp (BE); Universiteit Gent, Ghent (BE)

(72) Inventors: Wouter Ducheyne, Antwerp (BE); Christian Stevens, Ghent (BE)

(73) Assignees: Universiteit Gent, Ghent (BE); Caloritum NV, Antwerp (BE)

( * ) Notice: Subject to any disclaimer, the term of this patent is extended or adjusted under 35 U.S.C. 154(b) by 234 days.

(21) Appl. No.: 14/416,166

(22) PCT Filed: Jul. 26, 2013

(86) PCT No.: PCT/EP2013/065789
§ 371 (c)(1),
(2) Date: Jan. 21, 2015

(87) PCT Pub. No.: WO2014/016405
PCT Pub. Date: Jan. 30, 2014

(65) Prior Publication Data
US 2015/0225240 A1   Aug. 13, 2015

(30) Foreign Application Priority Data
Jul. 26, 2012   (GB) .................... 1213266.8

(51) Int. Cl.
*C01B 25/24* (2006.01)
*C01B 25/234* (2006.01)
*C09K 5/16* (2006.01)
*C01B 25/18* (2006.01)

(52) U.S. Cl.
CPC ............ *C01B 25/234* (2013.01); *C01B 25/18* (2013.01); *C01B 25/24* (2013.01); *C09K 5/16* (2013.01); *Y02P 20/129* (2015.11)

(58) Field of Classification Search
None
See application file for complete search history.

(56) References Cited

U.S. PATENT DOCUMENTS

| | | | | |
|---|---|---|---|---|
| 1,756,532 A | * | 4/1930 | Battegay | C01B 21/46 423/390.1 |
| 3,720,755 A | * | 3/1973 | Duyverman | C01B 17/90 423/307 |
| 4,161,210 A | | 7/1979 | Reid et al. | |
| 6,440,380 B1 | * | 8/2002 | Heise | C01B 25/06 423/299 |
| 9,163,868 B2 | * | 10/2015 | Ducheyne | C09K 5/18 |
| 2003/0035768 A1 | | 2/2003 | Myers et al. | |

FOREIGN PATENT DOCUMENTS

| | | |
|---|---|---|
| DE | 3025817 A1 | 2/1982 |
| JP | 59116338 | 5/1984 |
| WO | 2012/101110 A1 | 8/2012 |

OTHER PUBLICATIONS

Wiberg, Lehrbuch der Anorganischen Chemie, Jan. 1, 1985, Germany, pp. 659-660, XP-002715509.
International Search Report pertaining to Application No. PCT/EP2013/065789, 4 pages.
Written Opinion pertaining to Application No. PCT/EP2013/065789, 8 pages.

* cited by examiner

*Primary Examiner* — Wayne Langel
(74) *Attorney, Agent, or Firm* — Dinsmore & Shohl LLP

(57) ABSTRACT

This invention relates generally to new findings to improve a method of thermal energy storage or heat pump, i.e. increase the thermal energy from an external heat source, using a reversible condensation reaction with an inorganic oxoacid compound. It accordingly provides components to be used in said improved process as well as the use thereof in the aforementioned method, including the use in the manufacture of products of the condensation products or in the manufacture of the hydrolysis products.

14 Claims, 2 Drawing Sheets

US 9,731,969 B2

MEMBRANES, AZEOTROPIC AND CATALYTIC COMPONENTS

FIELD OF THE INVENTION

This invention relates generally to new findings to improve a method of thermal energy storage or heat pump, i.e. increase the thermal energy from an external heat source, using a reversible condensation reaction with an inorganic oxoacid and/or its salts, further named as inorganic oxoacid compound, such as for example described in PCT application PCT/EP2012/051025.

It accordingly provides new components to be used in said improved process as well as the use thereof in the aforementioned method, including the use in the manufacture of products of the condensation products like poly phosphoric acids or in the manufacture of the hydrolysis products like phosphoric acid.

BACKGROUND OF THE INVENTION

As already mentioned hereinbefore, the present application relates to new findings to improve a method of thermal energy recuperation or storage, based on a reversible condensation reaction of inorganic oxoacid compounds, in particular of inorganic phosphorus oxoacid compounds and/or its salts, such as for example with the formation polyphosphoric acid as poly inorganic oxoacid compounds (polymer) and described in the foregoing PCT application.

Such reaction basically consists of two steps (see FIG. 1); wherein in a first step (1) the thermal energy of the source is stored by means of a condensation reaction with the formation of poly inorganic oxoacid compounds (polymers) and the release of water; and wherein in a second step (2) the thermal energy is released from said polymer condensation product by means of a hydrolysation reaction through the addition of water and a release of the inorganic oxoacid compounds (monomers).

As experimentally determined, the condensation or polymerization reaction of FIG. 1, e.g. for pure (poly-) phosphoric acid, works with a thermal energy source at temperatures above about 100° C. It would however be desirable to use waste heat, further also called rest heat, at lower temperatures because of the huge amount of waste heat between 80-100° C. and even gigantic potential of waste heat from e.g. cooling towers of nuclear, coal, gas and other power generation plants working with exhausted rest heat of 50-100° C., typically 60-80° C. It has accordingly been an object of the present invention to find new components to be used as a method to improve the aforementioned condensation reaction, i.e. to make it feasible at lower temperatures of waste heat and make the production unit as compact and economical interesting as possible with faster reactions and process steps in order to find a wide acceptance in the market. It has been found that with the aid of catalysts and azeotropes, waste heat levels of temperatures below 100° C. can be used to drive the condensation or polymerization reaction. Alternatively, at these lower temperatures, one can also work with highly concentrated oxo acid compounds like phosphoric acids that are not polymerized or only polymerized in minor degree. In said instance the basis for the reversibility of the energy storage, mainly resides in the solution heat, i.e. heat released from mixing water and up concentrated oxoacid compounds, and only partially or not substantially in the hydrolysation reaction.

Also this concentration reaction basically consists of two steps (see FIG. 2); wherein in a first step (1) the thermal energy of the source is stored by means of a up concentration process and the release or separation of water by e.g. evaporation; and wherein in a second step (2) the thermal energy is released from said polymer condensation product or highly concentrated oxoacid compound by means of releasing exothermic dilution energy through the addition of water. Evidently, within this process of concentration change, a small amount of the thermal energy may still be used in a condensation reaction with the formation of poly inorganic oxoacid compounds (polymers) and the release of water in a minor degree; in the second step this part of the thermal energy will be released in the hydrolysation reaction with an exothermic release of the inorganic oxoacid compounds (monomers).

Consequently, and when performed at waste heat level below 100° C., the method of thermal energy or storage of the present invention is based on the combination of a reversible concentration and condensation reaction of inorganic oxoacid compounds, wherein in a first step (1) the thermal energy of the source is mainly stored by means of a upconcentration process and partially by means of a condensation reaction with the formation of poly inorganic oxoacid compounds (polymers) and the release of water; and wherein in a second step (2) the thermal energy is released from said polymer condensation product or highly concentrated oxoacid compound by means of an exothermic dilution reaction and by means of a hydrolysation reaction of the poly inorganic oxoacid compounds (polymers) through the addition of water and a release of the inorganic oxoacid compounds (monomers)

The new found components further defined hereinbelow, are chosen not only to speed up the aforementioned process steps and reactions, but also to lower the condensation reaction temperature, control corrosion effects, control solubility of the inorganic Oxo acids and or its salts, control fouling, control deposition of salts or other solids, improve energetic efficiency and many more effects needed to run a process much more economically then in the aforementioned PCT application PCT/EP2012/051025, adjusted to customer needs and continuously for several years with high reliability i.e. without many failures, malfunctions, outages, interruptions et cetera of whatever reason.

DESCRIPTION OF THE INVENTION

Figure 1:
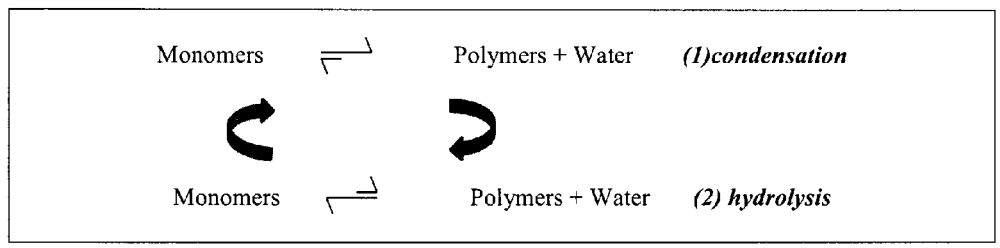
FIG. 1: Reaction scheme consisting of two steps; wherein in a first step (1) the thermal energy of the source is stored by means of a condensation reaction with the formation of poly inorganic oxoacid compounds (polymers) and the release of water; and wherein in a second step (2) the thermal energy is released from said polymer condensation product by means of a hydrolysation reaction through the addition of water and a release of the inorganic oxoacid compounds (monomers).

The present invention is based on the finding that the application of one or more of the following components has a significant impact on the yield of the condensation reaction and on the efficiency of the up concentration process, rendering the method more economical, i.e. faster, compacter, cheaper, but without affecting the general and long term workability of the energy storage or heat pump methods of the present invention. The components used in improving the yield of the condensation reaction, not only drive the equilibrium towards higher concentrations and/or higher polymerization degrees of inorganic oxoacid compounds like e.g. poly phosphoric acids, but were also found to be effective in controlling corrosion effects, controlling solubility of the inorganic Oxo acids and or its salts, controlling fouling, controlling deposition of salts or other solids, etc. . . .

It is generally based on the application of one or more components that drive the equilibrium of the condensation reaction towards higher concentrations and or the formation of the polymers, such as for example by removal of the reaction products from the reaction solution or by the use of catalysts to ease the poly condensation reaction; in particular using the combination of both removal of the reaction products and catalysts to ease the polycondensation reaction.

In a first aspect of the present invention the equilibrium of the aforementioned condensation reaction (1) is influenced by the use of one or more catalysts that ease the poly condensation reaction. In a particular embodiment said catalysts are used in combination with one or more measures to remove the reaction products from the reaction solution; more in particular in combination with a method to remove water from the reaction solution; even more in particular in combination with an azeotropic mixture.

Catalysts to be used in the condensation reaction (1) of inorganic oxoacid compounds towards poly inorganic oxoacid compounds (polymers) are selected from the group consisting of a first family of acidic catalysts; a second family of inorganic or metallic catalysts, among others containing metallic organic Frameworks as catalysts; or combinations thereof, optionally said catalysts can be added on zeolite as a carrier. As it is often found that for acid reaction and/or polymerization reactions the catalysts needs to be more acidic to drive the reaction, in a particular embodiment the catalysts used are selected from the first family of acidic catalysts.

As used herein the first family of acidic catalysts include but are not limited to;
1. Acids
 a. like sulfuric and sulfonic acids, methane sulfonic acid, p-toluene sulphonic acid,
 b. Lewis acids pure or on Silica, carbon or other inert material: like scandium(III) triflate, Indium triflate (lanthanide salts and lanthanide containing Lewis acids in general), $AlCl_3$, $BF_3$, pentahalides of phosphorus, arsenic, and antimony. Examples like $GaCl_3$, $InCl_3$, $SbCl_5$, $ZrCl_4$, $SnCl_4$, $FeCl_3$, $SmCl_3$, $ZnCl_2$.
2. Phosphines and organophosphines
3. Phosphazenes and polyphosphazenes
4. Sulfonated hyperbranched polymers and/or thiol promoters
5. Acidic zeolites, metal doped zeolites, basic zeolites
6. Base complexes
7. Others As used herein the family of inorganic and/or metallic catalysts include but are not limited to;
1. Metal oxydes $M_xO_y$ like $TiO_2$, $SiO_2$
2. $M_xL_zY_qO_y$ such as described in US2011/0021684 and US2011/004034 related to e.g. organopolysiloxane.
 a. in which M is a metal from the group copper, silver, boron, scandium, cerium, ytterbium, bismuth, molybdenum, germanium, ruthenium, nickel, Zink, iron, palladium, platinum, titanium and manganese
 b. L is a ligand, such as for example an anionic, cationic or neutral ligand,
 c. Y is a ligand different from L
 d. O is oxygen
 e. q and Z are each independently integers starting from 0; x and y are each integers starting from 1.
3. Salts of 2
4. Metal Organic frameworks
5. Other Inorganic catalysts
6. Other solids As evident from the examples hereinafter, the above mentioned catalysts all have a different but positive effect on the polymerization or poly condensation reaction of the inorganic acids and its salts like, in particular on the polymerization or poly condensation reaction of phosphoric and polyphosphoric acid and water. It was seen from our experiments that catalysts selected from the group of phosphines, phosphazenes and Lewis acids were bringing the biggest contribution to increase the polymerization reaction process. Accordingly, in a particular embodiment the catalysts used in the methods of the present invention are selected from the group consisting of phosphines, phosphazenes and Lewis acids; more in particular Lewis acids such as scandium(III) triflate, Indium triflate (lanthanide salts and lanthanide containing Lewis acids in general, e.g. $SmCl_3$), $AlCl_3$, $BF_3$, $GaCl_3$, $InCl_3$, $ZrCl_4$, $SnCl_4$, $ZnCl_2$, $FeCl_3$, pentahalides of phosphorus, arsenic, and antimony, such as $SbCl_5$.

Figure 2:
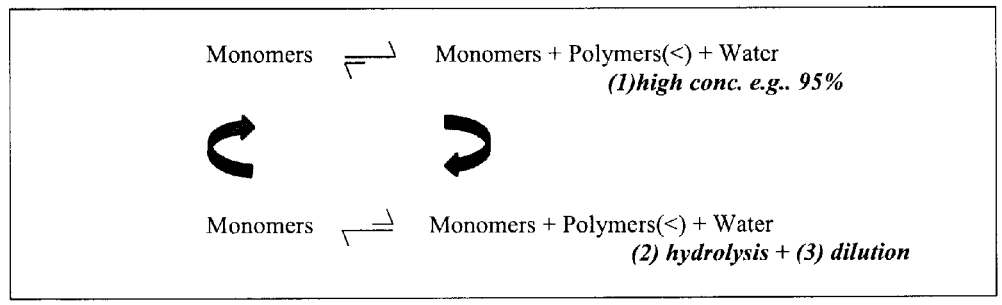
FIG. 2: Reaction scheme consisting of two steps, wherein in a first step (1) the thermal energy of the source is stored by means of a up concentration process and the release or separation of water by e.g. evaporation; and wherein in a second step (2) the thermal energy is released from said polymer condensation product or highly concentrated oxoacid compound by means of releasing exothermic dilution energy through the addition of water. Evidently, within this process of concentration change, a small amount of the thermal energy may still be used in a condensation reaction with the formation of poly inorganic oxoacid compounds (polymers) and the release of water in a minor degree; in the second step this part of the thermal energy will be released in the hydrolysation reaction with an exothermic release of the inorganic oxoacid compounds (monomers).

In another aspect the reaction equilibrium of the condensation reaction (FIG. 1) and/or concentration reaction (FIG. 2) is pushed to higher concentrations and/or to form more polymeric material by removal of water. Depending on design and temperature levels of customers, a first step can be the water removal with standard evaporation techniques, requiring minimal heat input and minimal electrical consumption. Such a state of the art techniques typical are, but not limited to, falling film-, thin layer(film)-, thin rotor layer-, natural circulation evaporation —and forced circulation evaporation techniques. Design to be chosen preferably out of these techniques in function of the available reaction mixture pressure and temperature. In case of low pressure or vacuum, e.g. at 40-100 mbar, of reaction mixture and e.g. relatively high viscous mixture, a falling film evaporator is preferred, in such a way that the falling film is wetting all the evaporators surface, in case of tubular heat exchanger the mixture is distributed in such a way that all tubular surface is wetted, conform state of the art distributors, to create the maximum evaporation surface and optimal economical design. This minimal wetting flow can be experimentally determined by skilled artisan, using e.g. a glassy tube and decrease the flow until unwetted areas arise.

In another step, whether or not following or preceding the above described water removal step, the water can also be removed from the reaction solution, by means of an azeotropic mixture characterized in that the components of said azeotropic mixture (here and also further in the text the effective boiling point of the mixture is described containing oxoacids, azeotropes and water, further named as azeotropic mixture) ideally have low atmospheric boiling points, with an azeotropic boiling point preferable between 25 and 150° C., even better between 50° C. and 120° C. and optimal between 70 and 100° C. When applying an azeotropic mixture, it was found that the most energy efficient separation is realized when working with heteroazeotropes in which the azeotropic concentration exhibits a solubility limit in order to separate the water and the, mostly organic and or aromatic, azeotrope using gravimetric separation techniques. In case of homoazeotrope systems with water no solubility limit is exceeded, and another separation step needs to be realized with e.g. an evaporation process such as e.g. in distillation- or membrane separation- or pervaporation techniques. Accordingly in one aspect of the present embodiment, the increase in concentration of the oxoacid compound (FIG. 2) and/or condensation reaction (FIG. 1) is pushed to a higher concentration and/or the formation of more polymeric material by removal of water using either an evaporation technique, an azeotropic mixture as defined hereinbefore, or a combination thereof. In a particular aspect of the present invention the equilibrium is pushed to a higher concentration and/or the formation of more polymeric material by removal of water using a hetero-azeotropic mixture.

A generic list of homoazeotropic components with water like e.g. but not limited to that can be used to increase the efficiency of the poly-condensation reaction are:

Acid halide, Acid anhydride, Alkane like cyclohexane, n-hexane, n-heptane, Aromatic components like benzene, (non carginogenic aromatic substances are preferred), Alkenes, Alkyl halides, Alkyne, Amides, Amines, Arenes, Aryl halides, Esters, Ethers, Ketones, Nitriles, Phenols, Sulfides, Sulfonic acids, like e.g. toluene sulfonic acid (TsOH), Thiols, Inorganic acids: Hydrogen chloride, hydrogen bromide, hydrogen iodide, hydrogen fluoride, nitric acid, hydrazine and many more. Even alcohols, Carboxylic acids, hydrogen peroxide and many more can be used, but these azeotropes are likely to give negative side effects due to the formation of other condensation products like e.g. esters, especially in the high temperature part of the referred process and accordingly less preferred within the methods of the present invention.

It is accordingly a further objective of the present invention to provide the use of an heteroazeotropic mixture to drive the equilibrium of the aforementioned condensation reaction (FIG. 1) of inorganic oxoacid compounds towards the formation of the poly inorganic oxoacid compounds (polymers); or to drive the equilibrium of the aforementioned concentration reaction (FIG. 2) of inorganic oxoacid compounds towards higher concentrations, characterized in that the components of said heteroazeotropic mixture have boiling points between 25 and 150° C. when exposed to reaction pressures between 0 and 10 bar. In particular characterized in that said heteroazeotropic mixture have boiling points between 25 and 150° C. when exposed to reaction pressures between 0.02 and 1 bar. Irrespective of the foregoing reaction pressures, within the cited ranges the boiling points of the heteroazeotropic are preferably between 25 and 100° C., even better between 50° C. and 120° C. and optimal, for low waste heat recovery, between 60 and 100° C. Examples of such heteroazeotropes with water are e.g. but not limited to: n-pentane, n-hexane, n-heptane, isooctane, n-octane benzene, cyclohexene, toluene, xylene (preferably m-xylene), $CCl_4$, tetrachloroethylene, $CS_2$.

The use of membranes for the solvent recuperation and water separation has already been addressed in the abovementioned PCT application. But in case of a specific azeotropic mixture, in particular when an heteroazeotropic mixture is used to remove the water from the reaction solution, this heteroazeotropic mixture can be removed from the reaction solution by means of a low energy consuming step, such as phase layer separation and/or gravimetric separation. Thus in a particular embodiment the present invention provides the use of a heteroazeotropic mixture with water, in combination with phase layer separation and/or gravimetric separation; in particular in combination with phase layer separation, to drive the equilibrium of a reversible reaction of inorganic oxoacid compounds and water towards higher concentrations of said inorganic oxoacid compounds and/or the formation poly inorganic oxoacid compounds (polymers) of said inorganic oxoacid compounds.

In the aforementioned PCT application, the sieving separation principle of a membrane was used in micro- and ultra-filtration and also the sorption or diffusion principle was used in nano and reverse osmosis filtration.

But it has now been found (FIG. 3) that from a separation efficiency viewpoint and/or an energetic viewpoint, in particular membranes attracting water from a solution, further named as hydrophilic membranes, can be used in the removal of water from the azeotropic mixture. In case membranes are used in combination with vaporous water passing through the membrane, this technique is called pervaporation. In combination of pervaporation with a membrane consisting out of either a hydrophilic top layer, a hydrophilic membrane structure or a hydrophilic surface, the pervaporation process for removing the water out of a solution with inorganic oxoacid(s) and or its salt(s), has a much higher upconcentration and reaction performance due to the higher membrane's diffusion efficiency.

In a further embodiment of the present invention it has been found, that from a separation efficiency viewpoint and/or an energetic viewpoint the water of the condensation reaction may be removed from the non hetero azeotropic mixture by means of organic or inorganic hydrophilic membrane separation techniques, analogous to the membrane separation techniques for the removal of water from the azeotropic mixture (supra).

Condensation of the reaction water thus obtained, i.e. using either pervaporation from either the azeotropic mixture or the reaction solution directly; or evaporation techniques out of the reaction solution and recuperation of water after the phase layer separation in case of heterogeneous azeotropic mixtures or heteroazeotropic mixtures, allows reuse of said condensed water phase in the hydrolysation reaction. This recuperated water that has been condensed and most probably sub cooled, can also be reheated with part or all kinds of rest heat available, preferably between 25-150° C., before being mixed with the polymers in the hydrolyzation reaction. Moreover it is a surplus for the efficiency of the process to even vaporize the recuperated water with the available rest heat in a following step in order to realize a maximum temperature lift or heat generation in the hydrolysation heat generation step.

Comparing mixing liquid water with the polymer to mixing vaporous water with the polymer, the vaporous water enables a higher heat generation due to the extra condensation heat above the reaction heat, consumed in the hydrolysation step. Thus in one method of the present invention, the water recuperated in the condensation reaction or up concentration reaction, is reheated with available rest heat, and preferably vaporized before being mixed with the polymers or concentrated inorganic oxoacid compounds in the hydrolysation reaction.

Figure 3:
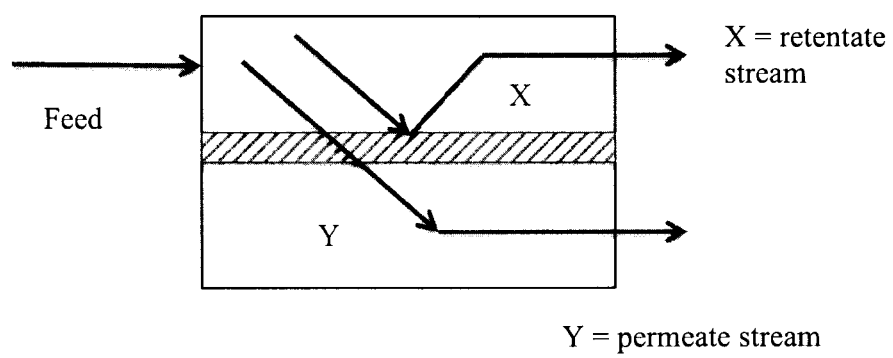
FIG. 3: Technique whereby hydrophilic membranes are used in the removal of water from the azeotropic mixture.

It is accordingly a second objective of the present invention to provide the use of a hydrophilic membrane, i.e. the permeate is water, to drive the equilibrium of the aforementioned condensation reaction (1) of inorganic oxoacid compounds towards the formation of the poly inorganic oxoacid compounds (polymers) by the removal of water from the reaction solution. Examples of membranes to be used, are e.g. but not limited to contain Silica-, Zeolite-, MOF-(Metal Organic Frameworks), ceramic-, metal-, PVA (Poly Vinyl Alcohol), Poly imide-, Poly amide-membranes, membranes based on acrylonitrile polymers or modifications thereof and many more metallic, inorganic membranes, organic membranes or combinations thereof, allowing water as being attracted by the hydrophilic properties of either hydrophilic top layer, hydrophilic membrane structure or hydrophilic surface, vapor or liquid, passing through and the said membranes retain the inorganic oxoacid compounds as the retentate stream (FIG. 3). In the case the membrane surface does not have hydrophilic properties, like e.g. with purely organic membranes, the membrane is modified by adding a hydrophilic layer, e.g. with a PVA layer, to it. It is found that the membrane's diffusion properties for the water, was increased by adding a hydrophilic layer or by making the surface hydrophilic.

As briefly addressed hereinbefore, the application of a hydrophilic membrane separation technique is preferably applied in case non hetero azeotropic mixture (herein before also referred to as homoazeotrope systems) are used to influence the equilibrium of a reversible reaction of inorganic oxoacid compounds and water. As will become evident from the examples hereinafter, using such combination the equilibrium is driven towards higher concentrations of said inorganic oxoacid compounds and/or the formation poly inorganic oxoacid compounds (polymers) of said inorganic oxoacid compounds, to a similar extend as seen with the heteroazeotropic mixture mentioned hereinbefore. Thus in a further embodiment the present invention provides the use of a non hetero azeotropic mixture with water, in combination with organic or inorganic hydrophilic membrane separation technique; in particular in combination with poly vinyl alcohols (PVA) or polyimide on an organic structured membrane, to drive the equilibrium of a reversible reaction of inorganic oxoacid compounds and water towards higher concentrations of said inorganic oxoacid compounds and/or the formation poly inorganic oxoacid compounds (polymers) of said inorganic oxoacid compounds. As some membranes like e.g. PVA or polyimide, are sensitive for acid exposure, a proper temperature control is required in order not to degrade or even destroy the hydrophilic properties of the membrane. By working e.g. with a separate vapor phase, containing the removed water and azeotrope, direct contact between the oxoacid and the membrane structure can be avoided and by doing so, a longer life time of the used membrane can be achieved. For the above reasons, a degradation or chemical resistance test at real process circumstances of each membrane should be executed before constructing the installation. Thus in one embodiment of the present invention, the aforementioned hydrophilic membrane separation techniques are used in combination with pervaporation, wherein a separate vapor phase containing the removed water and azeotrope is fed over the membrane.

In another embodiment of the present invention further components are used in the reversible condensation reaction of inorganic oxoacid compounds rendering the process to run continuously for many years with high reliability, i.e. without many failures, malfunctions, outages, interruptions, etcetera. Within the reaction solutions such further components may consist of inhibitors for corrosion of water-poly inorganic oxoacid mixtures and or their salts, pretreatment filming of the metallic equipment containing bases, acids and/or its salts, anti sealants for membranes or of antifoulants, such as hydroxydes like e.g. but not limited to Magnesium hydroxide, sodium nitrite, organophosphines, or combinations thereof.

Thus in a further aspect the aforementioned condensation reaction may be complemented with the use of inhibitors for corrosion of water-poly inorganic oxoacid mixtures. Such inhibitors are preferably selected from the group consisting of;

a. Special materials containing a functional azol group like pyrroles, pyrazoles, imidazoles, triazoles, tetrazoles, pentazoles, oxazoles, isoxazoles, thiasoles and isothiazoles. An example is an aromatic ring structure combined with azol geoup into benzotriazole, tolutriazoles and many more.

b. Heterocyclic aromatic ring compounds like pyridine, pyrimidine c. Mercaptans (thiols)

d. Aliphatic or aromatic amines like ethanol amine, aniline, melamines, . . .

e. Boric acids, Borates and borate esters f. Sulfonic acids and their salts (sulfonates) and or polymers thereof.

g. Carboxylic acids and poly carboxylic acids like e.g. benzoic acid, poly acrylic acids h. Organic films, containing e.g aldehydes.

i. Inorganic films with e.g. containing Mg . . .

j. Carbides like TiC, TuC (tungsten 2B checked??)

k. Anorganic systems containing phosphonic acid, nitrite systems l. Chelating agents m. Other complexes n. Metal oxydes like TaO . . .

o. Combinations of a) b) c) d), e), f), g), h) i) j) k) l) m) like for instance phosphonoacetic acid, mercaptobenzothiazole, phosphoric acid in combination with polycarboxylic acids: 2-Phosphonobutane-1,2,4-Tricarboxylic Acid (PBTA), hydroxyphophonoacetic acid or organic phosphate esters like Polyhydric alcohol phosphate ester (PAPE), 2-Mercaptobenzimidazole, norfloxacin, ciprofloxacin Example 1

Experimental Setup and Findings for Catalyst Testing

It was proven in laboratory setup that by the addition of a Lewis acid, polymerization of phosphoric acid towards polyphosphoric acid was significantly increased. As an exemplary embodiment we tested the effect of the Lewis acid Indiumtriflate on the polymerization of phosphoric acid and water.

Pressure of this experiment was set at an absolute pressure of 40 mbar, hereinafter also referred to as 40 mbara and in the temperature range between 100 and 150° C. For all experiments the starting concentration of the phosphoric acid and water was 75%. In a next step the temperature was kept constant in experiments at respectively 80-90-100-110-120-130-140-150° C. and the pressure was kept constant at +/−40 mbara, the water was removed by evaporation and polycondensation towards polyphosphoric acid. After 1 hour each experiment was stopped by removing vacuum and heating. In a last step the phosphoric acid was measure in NMR to determine the polymerization degree or % of phosphoric acid and water. At each temperature the experiment was done twice, i.e. one with addition of the catalyst and one without addition of any catalysts, i.e. the blanco. The differences in upconcentration between the 2, the catalyst and the blanco, were compared to determine the effectivity of the used catalysts.

In the test with Indiumtriflate, polymerization of phosphoric acid towards polyphosphoric acid was increased with up to 10%, i.e. from 95-100% phosphoric acid and water up to 96-110% phosphoric acid and water.

The experiments were repeated with the above mentioned catalysts all having a different but positive effect, e.g. for phosphoric acid of 1-10% concentration increase and thus accompanied with poly phosphoric acid formation, on the polymerization or poly condensation reaction of the inorganic acids and its salts. It was seen from our experiments that phosphines, phosphazenes and also Lewis acids were bringing the biggest contribution, 5-10% concentration increase in case of phosphoric acid, to the upconcentration and polymerization reaction process.

Example 2

Experimental Setup and Findings for the Hetero Azeotropic Mixtures

Similar to the setup for the catalysts, the experiments for the testing of efficiency of hetero azeotropes were done against blanco experiments, i.e. in the absence of the given hetero azeotropes.

In an exemplary experiment m-xylene was used as the hetero azeotropes with water. In said experiment this azeotrope was used under vacuum conditions (i.e. at 800 mbara), at a temperature of 80° C. to remove the water from phosphoric acid in a distillation followed by phase layer separation, i.e. heterogeneous azeotropic distillation. Experimentally the concentration was increased up to 96-98% and higher, compared to only 91-92% with blanco experiment at 800 mbara and +/−80° C. With this experiment it was proven that a hetero azeotrope like m-xylene brings a mayor improvement for the removal of water or upconcentration, from the phosphoric acid and water mixture but also enables polymerization to poly phosphoric acid. As was found in the experiments by NMR spectrometric analysis, polymerization of phosphoric acid towards polyphosphoric acid starts from concentrations around 95% phosphoric acid. As found in the experiments, at concentration from about 95 to 97%, said polymers are mainly pyrophosphoric acid (di-polymer), and for higher concentrations the tri- and higher polymeric phosphoric acid was found.

The experiment was repeated with blanco and other hetero azeotropes with water: n-pentane, n-hexane, n-heptane, isooctane, n-octane benzene, cyclohexene, toluene, m-xylene, $CCl_4$, tetrachloroethylene and $CS_2$. Using these other hetero azeotropes similar results were obtained.

Example 3

Experimental Setup and Findings for the Hydrophilic Membrane with Non-Heterogeneous Azeotropes Similar to the above-mentioned hetero azeotropic test set up, the non-heterogeneous azeotrope cyclohexane was added to a mixture of water and phosphoric acid, with a starting concentration of phosphoric acid in water of 75%. In a next step the water was removed by evaporation of the formed azeotropic mixture from the phosphoric acid at around 1 bara and a temperature of 90° C. The said azeotropic mixture was in a following step, in the vaporous phase, lead over an hydrophilic membrane, i.e. organic membrane with PVA/polyimide top layer, through which the water was transported and afterwards condensed.

The rest of the azeotrope, was condensed and fed again to the reaction solution. This set up was maintained for at least one hour. After this test vacuum was released and cooled down to 25° C. In a next step the phosphoric acid was analysed by NMR spectrometry. It was found that the concentration of the phosphoric acid mixture and water was around 96-98% this has to be compared to the only 92-93% with blanco experiment at 40 mbara and 90° C.

With this experiment it was proven a non hetero azeotrope like cyclohexane brings a mayor improvement for the removal of water or upconcentration, from the phosphoric acid and water mixture but also enables polymerization to poly phosphoric acid. As was found in the experiments by NMR spectrometric analysis, polymerization of phosphoric acid towards polyphosphoric acid starts from concentrations around 95% phosphoric acid.

The experiment was repeated with blanco and other non hetero azeotropes with water: Acid halide, Acid anhydride, Alkane like cyclohexane, n-hexane, n-heptane, Aromatic components like benzene, (non carginogenic aromatic substances are preferred), Alkenes, Alkyl halides, Alkyne, Amides, Amines, Arenes, Aryl halides, Esters, Ethers, Ketones, Nitriles, Phenols, Sulfides, Sulfonic acids, like e.g. toluene sulfonic acid (TsOH), Thiols, Inorganic acids: Hydrogen chloride, hydrogen bromide, hydrogen iodide, hydrogen fluoride, nitric acid, hydrazine and many more. Using these other non hetero azeotropes higher polymerization degree was obtained.

The invention claimed is:

1. A method to drive the equilibrium of a reversible condensation reaction of phosphoric acid and water towards higher concentrations of said phosphoric acid and/or the formation of poly phosphoric acids, the method, comprising:
adding one or more catalysts to a reaction solution so as to drive the equilibrium of the reversible condensation reaction, wherein the reaction solution comprises the phosphoric acid and water.

2. The method according to claim 1 wherein said one or more catalysts consist of acidic catalysts.

3. The method according to claim 1, wherein the one or more catalysts are metallic catalysts or inorganic catalysts or combinations thereof.

4. The method according to claim 3, wherein said metallic catalysts are Metallic Organic Frameworks.

5. The method of claim 1 wherein said catalysts are sulfuric acids; sulfonic acids; Lewis acids; Phosphazines; organo-phosphazines; phosphazenes; polyphosphazenes; Sulfonated hyperbranched polymers; thiol promoters; Acidic zeolites, metal doped zeolites, basic zeolites; or combinations thereof.

6. The method according to claim 1 wherein said catalysts are Metal oxides $M_xO_y$; organopolysiloxane polycondensation catalysts, including salts thereof; or combinations thereof.

7. The method according to claim 1, further comprising removal of water from the reaction solution using an azeotropic mixture wherein the components of said azeotropic mixture have a boiling point between 25 and 150° C. when exposed to reaction pressures between 0 and 10 bar.

8. The method according to claim 7, wherein said removal of water is realized by a heteroazeotropic mixture wherein the components of said heteroazeotropic mixture have a boiling point between 25 and 150° C. when exposed to reaction pressures between 0 and 10 bar.

9. The method according to claim 7, wherein the water is further separated from the azeotropic mixture by membrane separation using a hydrophilic membrane.

10. The method according to claim 7, wherein the water is further separated from the azeotropic mixture by gravimetric separation.

11. The method according to claim 7, further comprising reheating and revaporising the water removed from the reaction solution before being mixed with the poly phosphoric acids in a hydrolysation reaction to release thermal energy from said poly phosphoric acids.

12. The method according to claim 1, further comprising controlling corrosion effects, solubility of the phosphoric acid, fouling, and/or deposition of salts in the reversible condensation reaction via addition of process improvement components, wherein the process improvement components comprise inhibitors for corrosion of water; -(poly) phosphoric acid mixtures and/or their salts; anti-scalants for membranes, pretreatment filming for used inner equipment material, anti-foulants, or combinations thereof.

13. A method according to claim 12 wherein said process improvements components are selected from the group consisting of:
   a. Materials containing a functional azol group;
   b. Heterocyclic aromatic ring compounds;
   c. Mercaptans (thiols);
   d. Aliphatic or aromatic amines;
   e. Boric acids, Borates and borate esters;
   f. Sulfonic acids and their salts (sulfonates) and or polymers thereof;
   g. Carboxylic acids and poly carboxylic acids;
   h. Organic films;
   i. Inorganic films;
   j. Carbides;
   k. Anorganic systems containing phosphonic acid, and nitrite systems;
   l. Chelating agents;
   m. Other complexes; and
   n. Combinations thereof.

14. The method according to claim 3, wherein said catalysts are added on zeolite as a carrier.

* * * * *

UNITED STATES PATENT AND TRADEMARK OFFICE
CERTIFICATE OF CORRECTION

Page 1 of 2

PATENT NO. : 9,731,969 B2
APPLICATION NO. : 14/416166
DATED : August 15, 2017
INVENTOR(S) : Wouter Ducheyne et al.

It is certified that error appears in the above-identified patent and that said Letters Patent is hereby corrected as shown below:

In the Specification

Column 1, Line 53:
"compact and economical interesting as possible with faster"
Should read:
--compact and economically interesting as possible with faster--;

Column 2, Line 1:
"energy of the source by means of a up concentration"
Should read:
--energy of the source by means of an upconcentration--;

Column 2, Line 21:
"a upconcentration process and partially by means of a"
Should read:
--an upconcentration process and partially by means of a--;

Column 2, Line 38:
"process much more economically then in the aforementioned"
Should read:
--process much more economically than in the aforementioned--;

Column 2, Line 57:
"by means of a up concentration process and the release or"
Should read:
--by means of an upconcentration process and the release or--;

Signed and Sealed this
Twelfth Day of June, 2018

Andrei Iancu
*Director of the United States Patent and Trademark Office*

CERTIFICATE OF CORRECTION (continued)
U.S. Pat. No. 9,731,969 B2

Column 3, Line 11:
"and on the efficiency of the up concentration process,"
Should read:
--and on the efficiency of the upconcentration process--;

Column 4, Line 47:
"sumption. Such a state of the art techniques typical are, but"
Should read:
--sumption. Such state of the art techniques typically are, but--;

Column 7, Line 38:
"ganic oxoacid compounds, to a similar extend as seen with"
Should read:
--ganic oxoacid compounds, to a similar extent as seen with--;

Column 8, Line 20:
"azol geoup into benzotriazole, tolutriazoles and many more"
Should read:
--azol group into benzotriazole, tolutriazoles and many more--;

Column 9, Line 1:
"heating. In a last step the phosphoric acid was measure in"
Should read:
--heating. In a last step the phosphoric acid was measured in--; and Column 9, Line 43:
"brings a mayor improvement for the removal of water or"
Should read:
--brings a major improvement for the removal of water or--.